May 27, 1924.
R. J. GRETZ
SOLDERING IRON
Filed Aug. 10, 1920
1,495,686
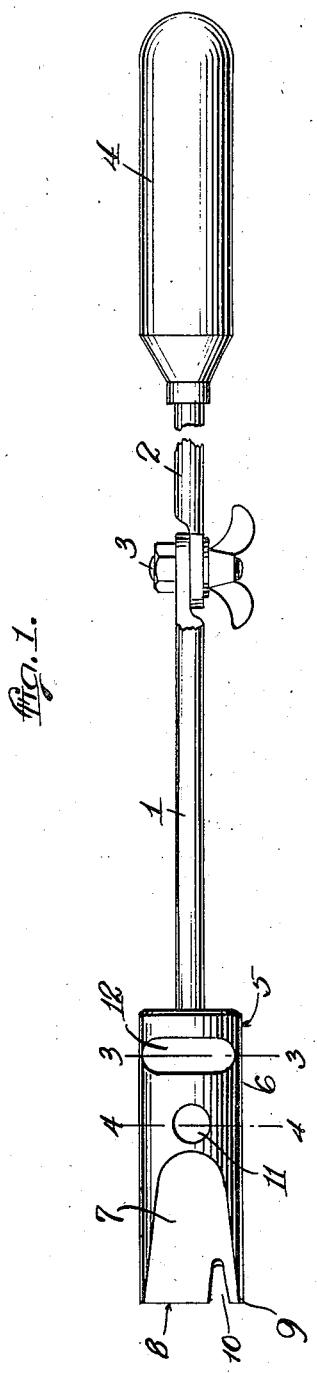
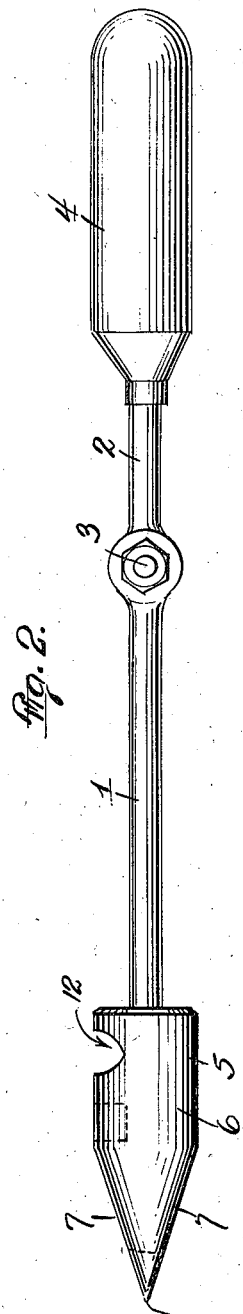
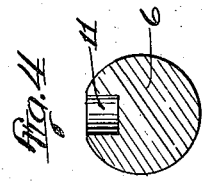
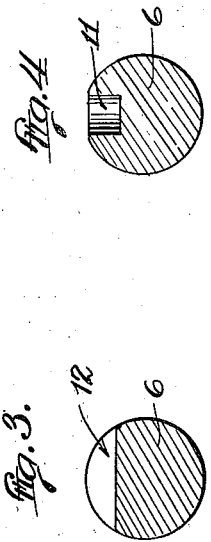
Inventor
Raymond J. Gretz.

Patented May 27, 1924.

1,495,686

UNITED STATES PATENT OFFICE.

RAYMOND J. GRETZ, OF JOLIET, ILLINOIS.

SOLDERING IRON.

Application filed August 10, 1920. Serial No. 402,670.

*To all whom it may concern:*

Be it known that I, RAYMOND J. GRETZ, a citizen of the United States, residing at Joilet, in the county of Will and State of Illinois, have invented certain new and useful Improvements in a Soldering Iron, of which the following is a specification.

This invention relates to soldering irons and more particularly to a combination soldering iron, the primary object being to provide a soldering iron for performing different kinds of soldering work.

Other objects of the invention will appear upon consideration of the following detail description and accompanying drawings, wherein:—

Fig. 1 is a side elevation of the implement constructed in accordance with my invention, Fig. 2 is a plan view of the same, Fig. 3 is a cross-section on the line 3—3 of Fig. 1, and Fig. 4 is a cross-section on the line 4—4 of Fig. 1.

Referring to the drawings by numerals, the shank of the tool is formed in two sections 1 and 2 pivotally connected together as indicated at 3 so that the relative angular positions of the sections 1 and 2 may be changed as desired so that the handle 4 attached to one of the sections 2 may be disposed at an angle with respect to the implement head.

Mounted on the end of the section 1 is the implement or tool head 5 which consists of a partially cylindrical body 6 having opposite angular faces 7 terminating in a forward edge 8. This edge 8 is adapted for general soldering and small work may be performed by the use of the point 9 which is formed by placing a notch 10 in the edge 8 of the implement as shown to advantage in Fig. 1. A recess or opening 11 is provided in the cylindrical body portion 6 of the tool head for use in applying solder to cable ends and the like in a manner well known in the art. Splice soldering is accomplished through the medium of a transverse groove or depression 12 formed in the body portion 6 of the tool head as shown in Figs. 1, 2 and 3.

With this implement it is possible to change the angular positions of the handle with respect to the tool so that it may be conveniently manipulated and it will be observed that four different types of soldering may be performed.

Minor changes may be made in the details of construction without departing from the spirit of the invention or the scope of the claim hereunto appended.

What I claim is:—

A soldering tool of the class described comprising a sectional shank, a cylindrical head attached to one end of the shank to provide a soldering iron, a handle provided on the opposite end of said shank, an adjusting member arranged intermediate the ends of the shank for adjusting the sections, said head having opposite angular faces terminating in a forward edge, the forward edge being provided with a groove to provide a soldering point, said tool head having an opening formed therein to receive the soldering material, and the head is provided with a transverse groove above said opening for splice soldering.

In testimony whereof, I have affixed my signature in the presence of two witnesses.

RAYMOND J. GRETZ.

Witnesses:
TILLMAN WOODHOUSE,
LEE INGALLS.